United States Patent [19]

Shikakura

[11] Patent Number: 5,703,648
[45] Date of Patent: Dec. 30, 1997

[54] CODING APPARATUS

[75] Inventor: Akihiro Shikakura, Kawasaki, Japan

[73] Assignee: Canon Kabushiki Kaisha, Tokyo, Japan

[21] Appl. No.: 801,361

[22] Filed: Feb. 19, 1997

Related U.S. Application Data

[63] Continuation of Ser. No. 300,330, Sep. 2, 1994, abandoned.

[30]     Foreign Application Priority Data

Sep. 17, 1993  [JP]  Japan .................... 5-255113

[51] Int. Cl.⁶ .................... H04N 7/30; H04N 7/50
[52] U.S. Cl. .................... 348/405; 348/413
[58] Field of Search .................... 348/405, 411, 348/412, 413; H04N 7/30, 7/50, 7/133

[56]         References Cited

U.S. PATENT DOCUMENTS

| | | | |
|---|---|---|---|
| 5,130,797 | 7/1992 | Murakami et al. | 348/416 |
| 5,170,259 | 12/1992 | Niihara | 348/415 |
| 5,267,334 | 11/1993 | Normille et al. | 348/409 |
| 5,379,070 | 1/1995 | Retter et al. | 348/408 |
| 5,394,190 | 2/1995 | Yamada | 348/411 |

*Primary Examiner*—Howard W. Britton
*Attorney, Agent, or Firm*—Fitzpatrick, Cella, Harper & Scinto

[57]         ABSTRACT

There is provided a coding apparatus comprising: a block dividing section for dividing one picture of an input image signal into (n) blocks; (n) coding sections for coding the image data of each of the (n) blocks; and a control section for dividing one picture of the input image signal into (m) blocks so as to exist over the (n) blocks and for controlling an amount of codes which are generated from each of the coding section every (m) blocks.

26 Claims, 3 Drawing Sheets

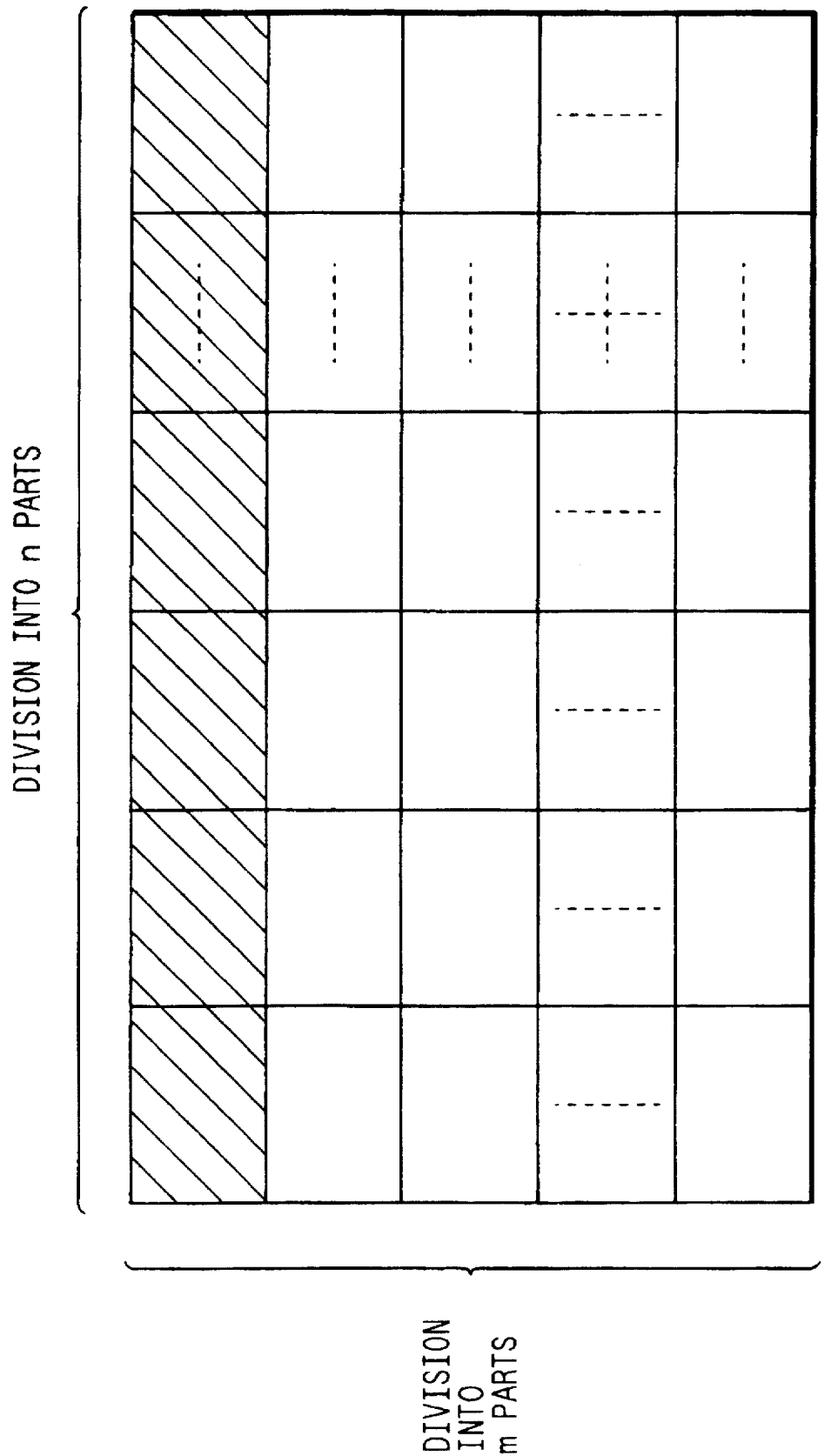

CODING APPARATUS

This application is a continuation of application Ser. No. 08/300,330 filed Sep. 2, 1994, now abandoned.

BACKGROUND OF THE INVENTION

1. Field of the Invention

The invention relates to a coding apparatus and, more particularly, to the control of an amount of codes which are generated when an image signal is coded.

2. Related Background Art

Hitherto, the in case of digitally transmitting image information, various kinds of compression coding systems have been proposed to reduce a transmission data amount.

As one of the coding systems proposed, there is a system for compression coding image information by switching between an intraframe compression coding system and an interframe compression coding system.

The intraframe compression coding system is a compression system for reducing information by using characteristics of a moving image in which brightnesses and colors of adjacent pixels are similar.

In the actual image, since similar brightness and color are almost continuous in most of the portion of the sky, a wall, or the like, even when only intraframe compression is used, compression of about ⅕ to ⅒ can be performed.

The interframe compression coding system is a system for obtaining an image by using only the information of the correction amount by using similar images.

That is, one picture plane and the next picture plane are compared every corresponding pixel and only a difference between them is extracted and transmitted, thereby compressing data.

Further, there is a motion compensation interframe predictive coding system as an interframe compression coding system which can accomplish high compression.

According to such a system, a picture plane of one frame is finely divided into an arbitrary number of blocks and the compression is attained by transmitting an image signal inputted on the basis of a block, by a motion vector indicative of a motion amount and the direction between the block of the present frame and the block preceding by one frame, the difference between which is the smallest and by a difference between the block of the present frame and the corresponding block of the previous frame.

The motion compensation interframe predictive coding system intends to perform the interframe predictive coding by detecting the motion of the input signal. A band compression of the signal can be effectively executed for a picture plane having a large motion.

However, in the case of compressing the image information by an interframe process, when an error occurs on a transmission path, the error is propagated. Therefore, there has been proposed an idea such that when the interframe process is executed a predetermined number of times, the intraframe process is automatically forcedly executed.

On the other hand, in the case where the above motion compensation interframe predictive coding system is applied to a signal having a large information amount such as an HDTV (High Definition Television) signal, it is required that the motion compensation interframe predictive coding circuit is made operative at a very high speed.

However, to construct a coding circuit so as to make the coding circuit operative at a high speed, a circuit scale must be remarkably enlarged, so that there is a problem such that the cost becomes expensive and economical performance deteriorates.

There is also an inconvenience such that there occur various problems such that when the coding circuit is made operative at a very high speed, electric power consumption increases, an adverse influence by noise or the like increases, the stability deteriorates, and the like.

SUMMARY OF THE INVENTION

Under such circumstances, it is an object of the invention to provide a coding apparatus which can perform a coding process at a high speed even for image information having a large information amount and can also obtain a very stable picture quality.

According to a preferred embodiment of the present invention, the above object is accomplished by a coding apparatus comprising: block dividing means for dividing one picture of an input image signal into (n) blocks; (n) coding means for coding image data of each of the (n) blocks; and control means for dividing one picture of the input image signal into (m) blocks so as to be exist over the (n) blocks and for controlling an amount of codes which are generated from each coding means every (m) blocks.

Other objects, features and advantages of the invention will become apparent from the following detailed description taken in conjunction with the accompanying drawings.

BRIEF DESCRIPTION OF THE DRAWINGS

FIG. 3 is a diagram for explaining a dividing process on one picture of an image signal in the embodiment.

DETAILED DESCRIPTION OF THE PREFERRED EMBODIMENT

An image coding apparatus using a motion compensation predictive coding according to an embodiment of the invention will now be described hereinbelow.

Figure 1:
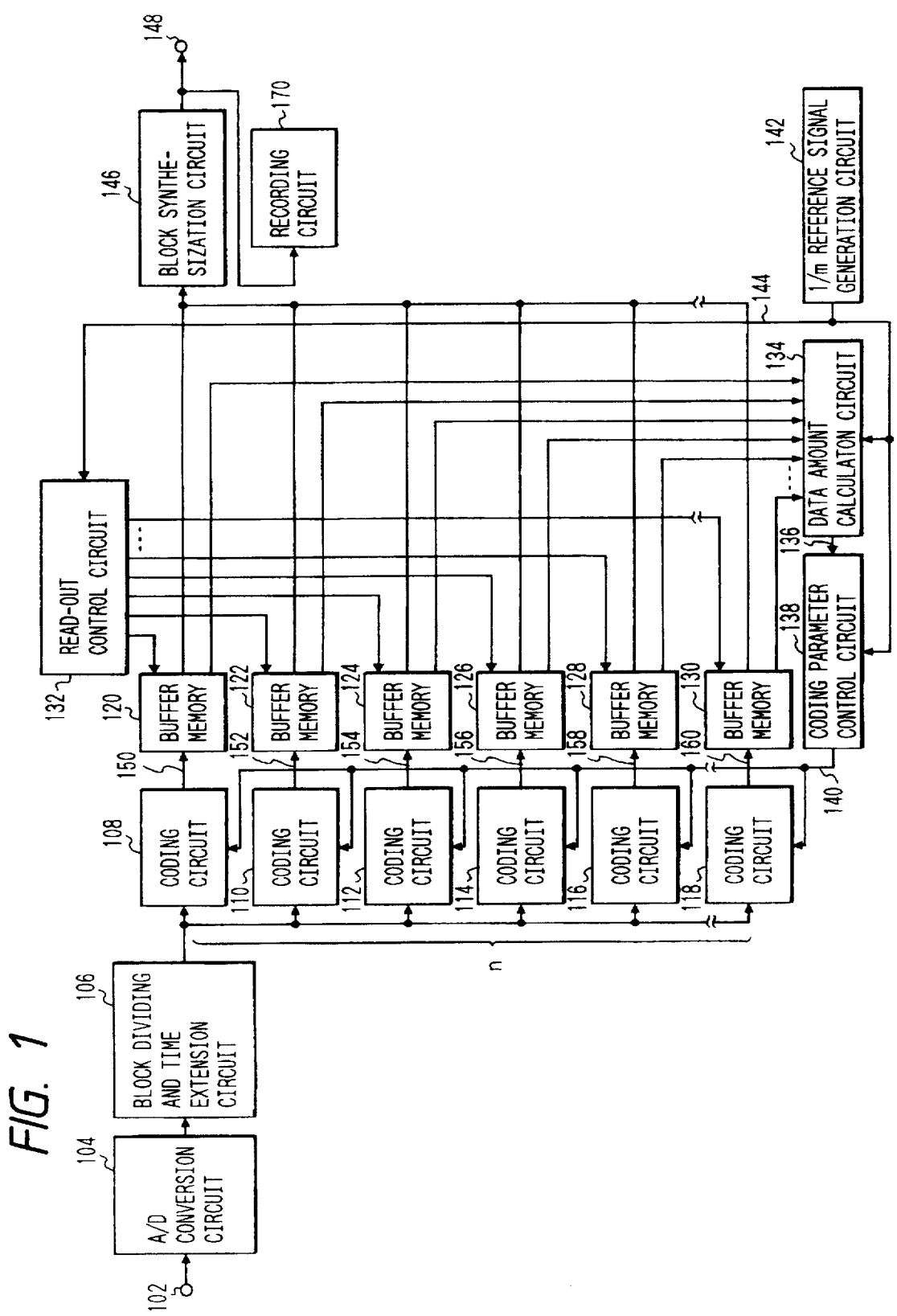
FIG. 1 is a block diagram of an image coding apparatus according to an embodiment of the invention.

FIG. 1 is a whole block diagram of the image coding apparatus using the motion compensation predictive coding of the embodiment of the invention.

In FIG. 1, reference numeral 102 denotes an input terminal from which an image signal is input; 104 an A/D conversion circuit for converting an analog signal into a digital signal; and 106 a block dividing and time extension circuit for dividing an image signal of one frame into (n) blocks and for expanding a time base of the divided image signal.

Reference numerals 108, 110, 112, 114, 116, . . . , and 118 denote coding circuits for performing a variable length coding using the motion compensation of the image signal. Reference numerals 120, 122, 124, 126, 128 . . . , and 130 denote buffer memories for temporarily storing the coded image signal.

Reference numeral 132 denotes a read-out control circuit for controlling the reading operation of data from the buffer memories 120, 122, 124, 126, 128, . . . , and 130; 134 a data amount calculation circuit for detecting amounts of data stored in the buffer memories and calculating the sum of them; and 138 a coding parameter control circuit for controlling amounts of data which is generated from the coding circuits 108, 110, 112, 114, 116, . . . , and 118.

Reference numeral 142 denotes a 1/m reference signal generation circuit for generating a reference signal of the 1/m time unit to divide the image signal of one frame into (m) blocks; 146 a block synthesization circuit for synthesizing the image signal which was divided into the blocks; 148 an output terminal for outputting the image signal supplied from the block synthesization circuit 146 to the outside; and 170 a recording circuit for recording the image signal supplied from the block synthesization circuit 146 onto a recording medium such as a magnetic tape or the like.

Each of the coding circuits 108, 110, 112, 114, 116, . . . , and 118 and each of the buffer memories 120, 122, 124, 126, 128, . . . , and 130 operate in parallel.

Figure 2:
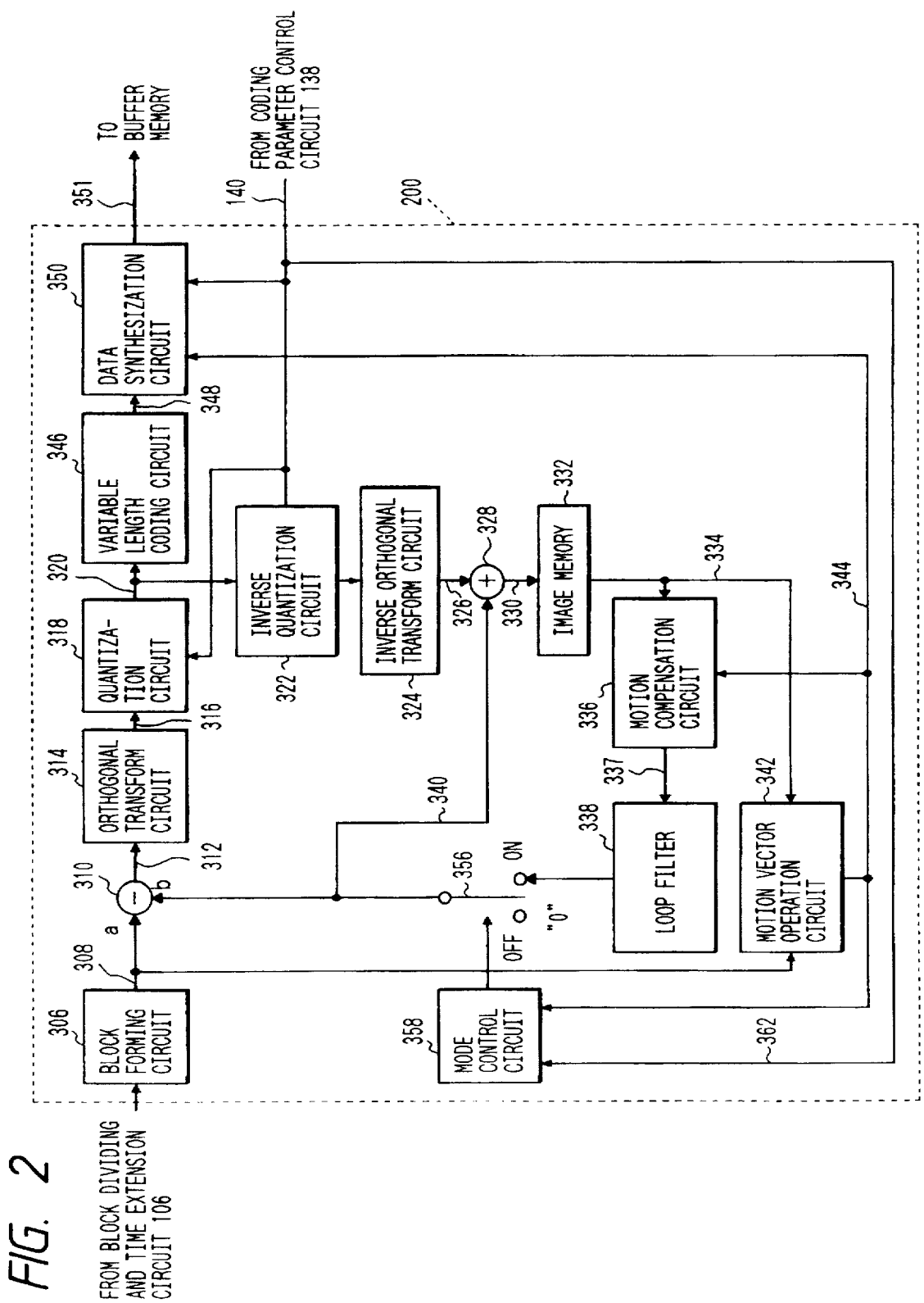
FIG. 2 is a detailed internal block diagram of coding circuits 108, 110, 112, 114, 116, . . . , and 118 in FIG. 1.

Each of the coding circuits 108, 110, 112, 114, 116, . . . , and 118 corresponds to a coding circuit 200 shown in FIG. 2.

Coding processes of the coding circuits 108, 110, 112, 114, 116, . . . , and 118 will now be described with reference to FIG. 2.

In FIG. 2, the image signal generated from the block dividing and time extension circuit 106 in FIG. 1 is divided into blocks of (8×8) pixels by a block forming circuit 306. In the embodiment, although the image signal has been divided into blocks of (8×8) pixels, the size of block is not limited to such an example.

An image signal 308 which was divided into the blocks is supplied to one input terminal (a) of a predictive error operation circuit 310 and to a motion vector operation circuit 342.

A prediction signal 340 which is calculated by the operation, which will be explained hereinlater, is input to another input terminal (b) of the predictive error operation circuit 310. The predictive error operation circuit 310 executes a differential arithmetic operation between the image signal 308 as a present signal and the prediction signal 340 and generates a predictive error signal 312.

The predictive error signal 312 is input to an orthogonal transform circuit 314 and is subjected to an orthogonal transformation such as discrete cosine transformation (hereinafter, simply referred to as a DCT) or the like and is output as an orthogonal transform coefficient 316 of the predictive error signal.

The orthogonal transform coefficient 316 is quantized by a quantization circuit 318 and is output as a quantization coefficient 320.

In this instance, by changing quantization steps of the quantization circuit 318, a data generation amount of coding data 351 is controlled.

The quantization steps are controlled on the basis of a parameter control signal 140 which is output from the coding parameter control circuit 138 in FIG. 1.

The quantization circuit 318 quantizes the orthogonal transform coefficient 316 by the optimum quantization step. The process for controlling the coding amount will be described in detail hereinbelow.

The parameter control signal 140 is also supplied to a mode control circuit 358 for switching the coding mode (intra/inter). The code amount control is also performed by the switching of the coding modes in the embodiment. The switching control will be described in detail hereinlater.

The quantization coefficient 320 is supplied to a variable length coding circuit 346 and is also sent to a local decoding section to produce the prediction signal 340. In the local decoding section, the quantization coefficient 320 is first inversely quantized by an inverse quantization circuit 322.

In this instance, in order to equalize the quantization step which is used in the inverse quantization circuit 322 with the quantization step used in the quantization circuit 318, the inverse quantization circuit 322 is also controlled by the parameter control signal 140.

Subsequently, the inverse quantization output is inversely orthogonal transformed by an inverse orthogonal transform circuit 324, so that a predictive error signal 326 including quantization/inverse quantization errors is reproduced.

In a reproduction image signal operation circuit 328, the predictive error signal 326 including the quantization/ inverse quantization errors is added to the prediction signal 340 used in the predictive error operation circuit 310, so that a reproduction image signal 330 which was locally decoded is derived and stored into an image memory 332.

The image memory 332 is provided for storing the reproduction image signal 330 of the present frame and for outputting a signal which was delayed by a predetermined period, for example, a reproduction image signal 334 of the previous frame.

A motion vector operation circuit 342 detects a motion amount and a direction of an image by comparing the image signal 308 of the present frame and the reproduction image signal 334 of the previous frame which is output from the image memory 332, thereby calculating a motion vector signal 344 including the information indicative of the motion of the coding block and the intra/inter mode information. The motion vector signal 344 is supplied to a motion compensation circuit 336 and a mode control circuit 358 in order to produce a prediction signal and is also supplied to a data synthesization circuit 350 for transmission.

The motion compensation circuit 336 motion compensates the reproduction image signal 334 of the previous frame by using the motion vector signal 344 and generates a motion compensated prediction signal 337.

The motion compensated prediction signal 337 is subjected to a two-dimensional low pass filtering process by a loop filter 338 in order to make the boundary of the coding blocks inconspicuous and is supplied as a prediction signal 340 to a switch 356.

When the switch 356 is ON, the prediction signal 340 is supplied to the predictive error operation circuit 310 and the reproduction image signal operation circuit 328.

When the switch 356 is ON, the coding circuit 200 operates in the inter mode, namely, as a motion compensation interframe predictive coding circuit.

When the switch 356 is OFF, the prediction signal 340 is set to "0" and the coding circuit 200 operates in the intra mode, namely, as an intraframe predictive coding circuit.

The ON/OFF operations of the switch 356 are controlled by the mode control circuit 358.

The mode control circuit 358 controls the switch 356 in accordance with the motion vector signal 344 and parameter control data 362. For example, in the case where there is no correlation between the image data of the present frame and the image data of the previous frame because of a change in scene or the like, the motion vector signal 344 indicative of the intra mode is input, thereby turning off the switch 356.

Since it is necessary to code the input signal 308 in the intra mode at the optimum period for prevention of the propagation of errors, the switch 356 is turned off at a proper timing.

In the embodiment, the switching operation of the intra/ inter modes is controlled by using the parameter control signal 140 from the coding parameter control circuit 138 in FIG. 1.

The data amount calculation circuit 134 in FIG. 1 calculates the sum of the data accumulation amounts in the buffer memories. The coding parameter control circuit 138 outputs the parameter control signal 140 to control an amount of codes which are generated upon coding in accordance with the signal generated from the data amount calculation circuit 134.

In the embodiment, when the data accumulation amount calculated by the data amount calculation circuit 134 is less than a predetermined value, the coding parameter control circuit 138 generates a control signal to switch the operating mode to the intra mode as a parameter control signal 140.

The deterioration of the picture quality can be minimized by the above process.

The quantization coefficient 320 which is output from the quantization circuit 318 is input to the variable length coding circuit 346 and is subjected to a scanning order conversion (zigzag scan or the like) (not shown). After that, it is subjected to a variable length coding such as a run length/Huffman coding or the like.

Coding data 348 after completion of the variable length coding is synthesized with the motion vector signal 344 and the parameter control signal 140 by the data synthesization circuit 350 and is rearranged into a predetermined format and is written into the buffer memory in FIG. 1.

A dividing process on one picture plane of the image signal in the embodiment will now be described.

FIG. 3 is a diagram for explaining a dividing process on one picture plane of the image signal of the embodiment.

In the embodiment, in FIG. 3, (n) dividing regions of which the (n) parallel coding circuits 108, 110, 112, 114, 116, . . . , and 118 are in charge and (m) dividing regions which were set in the direction different from the dividing direction of the (n) dividing regions so as to exist in the (n) dividing regions are shown on one picture plane.

In the embodiment, the picture plane is divided into (n) regions in the lateral direction and (n) parallel coding processes are executed, thereby reducing the operating speed of each of the coding circuits 108, 110, 112, 114, 116, . . . , and 118. Further, the coding parameters are controlled on a unit basis of the region which is obtained by dividing the picture plane into (m) regions in the vertical direction. The direction to divide into (n) regions perpendicularly intersects the direction to divide into (m) regions.

The whole processing operation of the image coding apparatus of the embodiment will now be described hereinbelow with reference to FIGS. 1 and 3.

In FIG. 1, the analog image signal input to the input terminal 102 is converted into the digital signal by the A/D conversion circuit 104.

As shown in FIG. 3, the digital image signal is divided into (n) blocks every frame by the block dividing and time extension circuit 106 and is supplied to the (n) coding circuits 108, 110, 112, 114, 116, . . . , and 118 provided in correspondence to the (n) divided blocks. In this instance, since each of the divided image signals is subjected to the extension of the time base by the block dividing and time extension circuit 106, the processing speed of each of the coding circuits 108, 110, 112, 114, 116, . . . , and 118 is reduced into 1/n as compared with the speed in the case where the image signal is not divided.

Due to this, even for an image signal having a large information amount, a coding process as it is executed in the coding circuit 200 shown in FIG. 2 can be performed at a high speed.

Coding data 150, 152, 154, 156, 158, . . . , and 160 which were coded by the coding circuits 108, 110, 112, 114, 116, . . . , and 118 and to which the additional data such as motion vector signal and parameter control signal 140 were added are input to the buffer memories 120, 122, 124, 126, 128, . . . , and 130, respectively. The buffer memories 120, 122, 124, 126, 128, . . . , 130 temporarily store the coding data 150, 152, 154, 156, 158, . . . , and 160 which are Generated from the coding circuits 108, 110, 112, 114, 116, . . . , and 118 at irregular rates and sequentially read out the data at a predetermined data rate by the address control of the read-out control circuit 132.

The coding data read out from the buffer memories 120, 122, 124, 126, 128, . . . , and 130 is supplied to the block synthesization circuit 146. The block synthesization circuit 146 synthesizes the image signals which were divided into (n) blocks and coded and supplies the synthesized image signal to the output terminal 148 and the recording circuit 170.

The control of coding parameters in case of the embodiment having the foregoing plurality of coding circuits and plurality of buffer memories will now be described hereinbelow.

The 1/m reference signal generation circuit 142 generates a 1/m reference signal 144 of the time unit which is obtained by dividing one frame into (m) portions.

On the basis of the 1/m reference signal 144, the data amount calculation circuit 134 detects the amounts of data accumulated in the buffer memories 120, 122, 124, 126, 128, . . . , and 130 and calculates the sum of them.

On the basis of the data amount signal 136 indicative of the total data accumulation amount calculated by the data amount calculation circuit 134, the coding parameter control circuit 138 generates the parameter control signal 140, thereby controlling the generation amounts of the coding data 150, 152, 154, 156, 158, . . . , and 160 which is output from the coding circuits 108, 110, 112, 114, 116 . . . , and 118, respectively.

The operation of each of the coding circuits 108, 110, 112, 114, 116, . . . , and 118 by the parameter control signal 140 is similar to the operation of the coding circuit 200 shown in FIG. 2 mentioned above.

That is, by executing in parallel the control of the quantization steps of the quantization circuit 318 provided for each of the coding circuits 108, 110, 112, 114, 116, . . . , and 118 and the switching control of the intra/inter modes of the mode control circuit 358, the generation amounts of the coding data 150, 152, 154, 156, 158, . . . , and 160 are controlled.

For example, when the total data accumulation amount of the buffer memories 120, 122, 124, 126, 128, . . . , and 130 calculated by the data amount calculation circuit 134 is larger than a predetermined first threshold value, the quantization circuit provided for each of the coding circuits 108, 110, 112, 114, 116, . . . , and 118 is made operative by the quantization steps so as to reduce the generation amounts of the coding data 150, 152, 154, 156, 158, . . . , and 160, thereby controlling so that the total data accumulation amount is smaller than the first threshold value.

On the contrary, when the total data accumulation amount of the buffer memories 120, 122, 124, 126, 128, . . . , and 130 calculated by the data amount calculation circuit 134 is smaller than a predetermined second threshold value, the quantization circuit provided for each of the coding circuits 108, 110, 112, 114, 116, . . . , and 118 is made operative so as to increase the generation amounts of the coding data 150, 152, 154, 156, 158, . . . , and 160, thereby controlling so that the total data accumulation amount is larger than the second threshold value.

That is, in the embodiment, a control such that the total data accumulation amount lies within a predetermined range is executed.

The embodiment is characterized in that by inputting the parameter control signal 140 in parallel to the coding circuits 108, 110, 112, 114, 116, . . . , and 118 which execute processes in parallel, the coding parameters of the coding circuits 108, 110, 112, 114, 116, . . . , and 118 are controlled by using the same value while setting the 1/m reference signal 144 into a unit.

When the 1/m reference signal 144 is used as a unit, the total data accumulation amount of the buffer memories 120, 122, 124, 126, 128 . . . , and 130 which is detected and calculated by the data amount calculation circuit 134 corresponds to, for example, the generation amounts of the coding data 150, 152, 154, 156, 158, . . . , and 160 of the hatched portions in FIG. 3.

By executing the control as mentioned above, in each region which is derived by dividing into the (m) blocks while setting the 1/m reference signal 144 into a unit, the outputs from the coding circuits 108, 110, 112, 114, 116, . . . , and 118 which are divided into (n) signals and are processed in parallel are coded by the same coding parameter and the same picture quality is obtained. Therefore, the differences of the picture qualities in the boundary portions of the images which were divided into (n) regions and were processed in parallel can be eliminated. Further, the control of the coding parameter is executed every block obtained by dividing one frame into (m) blocks and the data accumulation change amounts of the buffer memories 120, 122, 124, 126, 128, . . . , and 130 are monitored every small amount. Therefore, in the case where it is necessary to suddenly change the coding parameter as in case of, for example, a change in scene or the like, the operation such that the picture quality of the whole picture plane suddenly deteriorates because a feedback time constant is small can be prevented.

By the above method, the generation amounts of the coding data 150, 152, 154, 156, 158, . . . , 160 are controlled and the coding data stored in the buffer memories 120, 122, 124, 126, 128, . . . , and 130 is sequentially read out by the read-out control circuit 132. However, the read-out control is also made correspond to that the coding parameter control is executed on a unit basis of the 1/m reference signal 144, thereby sequentially reading out the accumulation data on a unit basis of the 1/m reference signal 144 in accordance with the order of, for example, the buffer memories 120, 122, 124, 126, 128, . . . , and 130.

The data read out from the buffer memories 120, 122, 124, 126, 128, . . . , and 130 is synthesized by the block synthesization circuit 146 on a unit basis of the region shown by the hatched portion in FIG. 3. The synthesized data is supplied to the output terminal 148 and recording circuit 170.

According to the construction and method as described above, an image coding apparatus in which the coding section and the buffer memory section are allowed to execute the processing operations in parallel is realized.

Since the motion compensation predictive coding can be applied to the image signal of a large information amount without making the operating speed very high, it is possible to prevent the electric power consumption from being increased and an adverse influence by the noises from being.

On the other hand, when a large amount of high speed image signal is divided into (n) portions and coded in parallel, unit of the code amount control is performed such that a data amount when predetermined image data is collected from each of the (n) divided blocks and coded is detected. Therefore, even in the case where the image data is divided into (n) portions and coded in parallel, the differences of the picture qualities in the boundary portions of the divided images can be eliminated.

Further, since the accumulation change amounts of the buffer memories are monitored for every small amount, for example, in the case where it is necessary to suddenly change the coding parameter at the time of a change in scene or the like, the operation such that the picture quality of the whole picture plane suddenly deteriorates because the feedback time constant is small can be prevented.

The present invention is not limited to the foregoing embodiments but many modifications and variations are possible within the spirit and scope of the appended claims of the invention.

For example, although FIG. 3 shows the example in which the direction to divide into (n) portions perpendicularly intersects the direction to divide into (m) portions on the picture plane, the invention is not limited to such an example.

If the image data from the (n) divided blocks is collected and the code amount control is executed, the differences of the picture qualities for each of the divided blocks can be eliminated.

Although the embodiment has been described on the assumption that the picture unit has been set to the frame unit, similar objects and effects of the invention can be also accomplished even by setting the picture unit to the field unit.

In other words, the foregoing description of embodiments has been given for illustrative purpose only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A coding apparatus comprising:
   a) block dividing means for dividing one picture of an input image signal into (n) blocks;
   b) (n) coding means for coding the image signals of said (n) blocks; and
   c) control means for dividing one picture of said input signal into (m) blocks so as to exist over said (n) blocks and for controlling an amount of codes which are generated from each of said coding means in a unit of each of said (m) blocks.

2. An apparatus according to claim 1, wherein said coding means has quantizing means for quantizing said image signal, and said control means controls quantization steps of said quantizing means.

3. An apparatus according to claim 1, further having synthesizing means for synthesizing the image signals which are output from said (n) coding means.

4. An apparatus according to claim 1, wherein said coding means performs a motion compensation predictive coding.

5. An apparatus according to claim 4, wherein said coding means outputs motion information used when said motion compensation predictive coding is executed together with the coded image signal.

6. An apparatus according to claim 1, further having (n) memory means for storing each of the image signals coded by said coding means.

7. An apparatus according to claim 6, wherein said coding means has an intraframe coding mode and an interframe coding mode, and said apparatus further has switching means for switching said coding modes in accordance with the data amount stored in said (n) memory means.

8. An apparatus according to claim 6, wherein said control means changes a coding parameter of each of said coding means in accordance with the data amount stored in said (n) memory means, thereby controlling the amount of codes which are generated from said coding means.

9. An apparatus according to claim 8, wherein said coding means has quantizing means for quantizing said image signal, and said coding parameter is a quantization step of said quantizing means.

10. A coding apparatus comprising:

dividing means for dividing one picture of an input image signal into a plurality of blocks;

a plurality of coding means each for coding the image signal every block divided by said dividing means;

memory means for storing each of the image signals coded by each of said coding means; and control means for controlling a code amount of a predetermined image signal collected from each of said blocks and coded by each of said coding means, said control means controlling the code amount by changing a coding parameter of each of said coding means in accordance with the data amount stored in said memory means, thereby controlling the amount of codes which are generated from each of said coding means.

11. An apparatus according to claim 10, wherein said coding means has quantizing means for quantizing said image signal, and said control means controls a quantization step of said quantizing means.

12. An apparatus according to claim 10, further having synthesizing means for synthesizing the coded image signals which are output from said plurality of coding means.

13. An apparatus according to claim 10, wherein said coding means has quantizing means for quantizing the image signal, and said coding parameter is a quantization step of said quantizing means.

14. An apparatus according to claim 10, wherein said coding means has an intraframe coding mode and an interframe coding mode, and said apparatus further has switching means for switching said coding modes in accordance with the data amount stored in said memory means.

15. An apparatus according to claim 10, wherein said coding means executes a motion compensation predictive coding.

16. An apparatus according to claim 15, wherein said coding means outputs motion information used when said motion compensation predictive coding is executed together with the coded image signal.

17. A coding apparatus comprising:

a) dividing means for dividing one picture of an input image signal into a plurality of first blocks;

b) a plurality of coding means each for coding the image signal of each said first block, each of said plurality of coding means dividing each said first block into a plurality of second blocks and performing a coding processing on each said second block; and c) control means for controlling a coding parameter of each of said coding means according to an amount of codes which are generated when the image signal of a predetermined number of said second blocks are coded, said predetermined number of second blocks being extracted from at least two of said first blocks.

18. An apparatus according to claim 17, wherein said coding means has quantizing means for quantizing said image signal, and said control means controls a quantization step of said quantizing means.

19. An apparatus according to claim 17, further having synthesizing means for synthesizing the codes which are output from said plurality of coding means.

20. An apparatus according to claim 17, wherein said coding means executes a motion compensation predictive coding.

21. An apparatus according to claim 17, further having memory means for storing each of the codes produced by each of said coding means.

22. An apparatus according to claim 21, wherein said control means controls the coding parameter of each of said coding means in accordance with the data amount stored in said memory means.

23. An apparatus according to claim 22, wherein said coding means has quantizing means for quantizing said image signal, and said control means controls a quantization step of said quantizing means.

24. A coding method comprising the steps of:

a block dividing step of dividing one picture of an input image signal into (n) blocks;

a coding step of coding the image signals of said (n) blocks using (n) coding means; and a control step of dividing one picture of the input image signal into (m) blocks so as to exist over said (n) blocks and for controlling an amount of codes which are generated from each of said coding means in a unit of each of said (m) blocks.

25. A coding method comprising the steps of:

a dividing step of dividing one picture of an input image signal into a plurality of blocks;

a coding step of coding the image signal using a plurality of coding means each for coding the image signal every block divided by said dividing step;

a memory step of storing each of the image signals coded by each of said coding means; and a control step of controlling a code amount of a predetermined image signal collected from each of said blocks and coded by each of said coding means, said control step controlling the code amount by changing a coding parameter of each of said coding means in accordance with the data amount stored in said memory step, thereby controlling the amount of codes which are generated from each of said coding means.

26. A coding method comprising the steps of:

a dividing step of dividing one picture of an input image signal into a plurality of first blocks;

a coding step of coding the image signal using a plurality of coding means each for coding the image signal of each said first block, each of the plurality of coding means dividing each first block into a plurality of second blocks and performing a coding processing on each said second block; and a control step of controlling a coding parameter of each of the coding means according to an amount of codes which are generated when the image signal of a predetermined number of said second blocks are coded, said predetermined number of second blocks being extracted from at least two of said first blocks.

* * * * *

UNITED STATES PATENT AND TRADEMARK OFFICE
CERTIFICATE OF CORRECTION

PATENT NO. : 5,703,648
DATED : December 30, 1997
INVENTOR(S) : AKIHIRO SHIKAKURA Page 1 of 2

It is certified that error appears in the above-identified patent and that said Letters Patent is hereby corrected as shown below:

Item [57] ABSTRACT

Line 8, "section" should read --sections--.

COLUMN 1

Line 13, "the in" should read --in the--.

COLUMN 2

Line 22, "be" should be deleted; and
   Line 66, "is" should read --are--.

COLUMN 6

Line 8, "Generated" should read --generated--.

COLUMN 7

Line 46, "correspond to that the" should read
         --to correspond so that. The--; and
   Line 67, "being." should read --being increased.--.

UNITED STATES PATENT AND TRADEMARK OFFICE
CERTIFICATE OF CORRECTION

PATENT NO. : 5,703,648
DATED : December 30, 1997
INVENTOR(S) : AKIHIRO SHIKAKURA It is certified that error appears in the above-identified patent and that said Letters Patent is hereby corrected as shown below:

COLUMN 8

```
Line 37, "every" should read --any--; and
Line 41, "specifications" should read --specification--.
```

Signed and Sealed this

Eighth Day of September, 1998

Attest:

BRUCE LEHMAN

Attesting Officer    Commissioner of Patents and Trademarks